United States Patent [19]

Orum et al.

[11] 4,213,480

[45] Jul. 22, 1980

[54] MANUAL OVERRIDE FOR HYDRAULIC GATE VALVE ACTUATORS

[75] Inventors: Paul R. Orum, Stafford; Larry A. Vyvial, Rosenberg, both of Tex.

[73] Assignee: ACF Industries, Incorporated, New York, N.Y.

[21] Appl. No.: 973,517

[22] Filed: Dec. 26, 1978

[51] Int. Cl.[3] .................. F16K 37/00; F16K 31/00; F16K 31/44

[52] U.S. Cl. ..................... 137/556; 251/14; 251/267

[58] Field of Search .............. 116/277; 222/47, 49, 222/50; 137/556; 251/327, 213, 266, 267, 77, 14; 188/314, 317

[56] References Cited

U.S. PATENT DOCUMENTS

| | | | |
|---|---|---|---|
| 951,927 | 3/1910 | Whitney | 116/277 |
| 2,114,139 | 4/1938 | Grosthwait, Jr. et al. | 251/267 |
| 2,633,868 | 4/1953 | Berhoudar | 137/556 |
| 2,919,590 | 1/1960 | Griswold | 137/556 |
| 2,919,883 | 1/1960 | Murphy | 188/317 |
| 3,198,034 | 8/1965 | Witte et al. | 251/14 |
| 3,244,399 | 4/1966 | Jones et al. | 251/62 |
| 3,378,224 | 4/1968 | Boyle | 251/14 |
| 3,466,001 | 9/1969 | Nelson | 251/327 |
| 3,889,922 | 6/1975 | Peters | 137/553 |

FOREIGN PATENT DOCUMENTS

| | | | |
|---|---|---|---|
| 1343840 | 10/1963 | France | 188/314 |
| 259565 | 12/1960 | Netherlands | 188/314 |

*Primary Examiner*—Martin P. Schwadron
*Assistant Examiner*—A. Michael Chambers
*Attorney, Agent, or Firm*—Eugene N. Riddle

[57] ABSTRACT

A double acting manual override mechanism for the hydraulic actuator of a subsea gate valve, and a visual indicator device for indicating the gate position. The gate is normally held open by hydraulic pressure and is moved by a spring to a fail closed position in the event of a malfunction. The override includes a drive nut threaded onto the valve stem and a drive sleeve which is telescoped on the drive nut and connected therewith by a series of splines. Spaced apart abutment surfaces are provided on the sleeve to limit axial movement of the drive nut on the valve stem in both directions. Rotation of the sleeve by means of an adapter is translated into rotation of the drive nut which contacts one of the abutment surfaces and thereafter effects axial movement of the valve stem to open or close the gate. The indicator device includes a watertight, transparent housing within which an indicator disc moves in response to movement of the gate.

14 Claims, 7 Drawing Figures

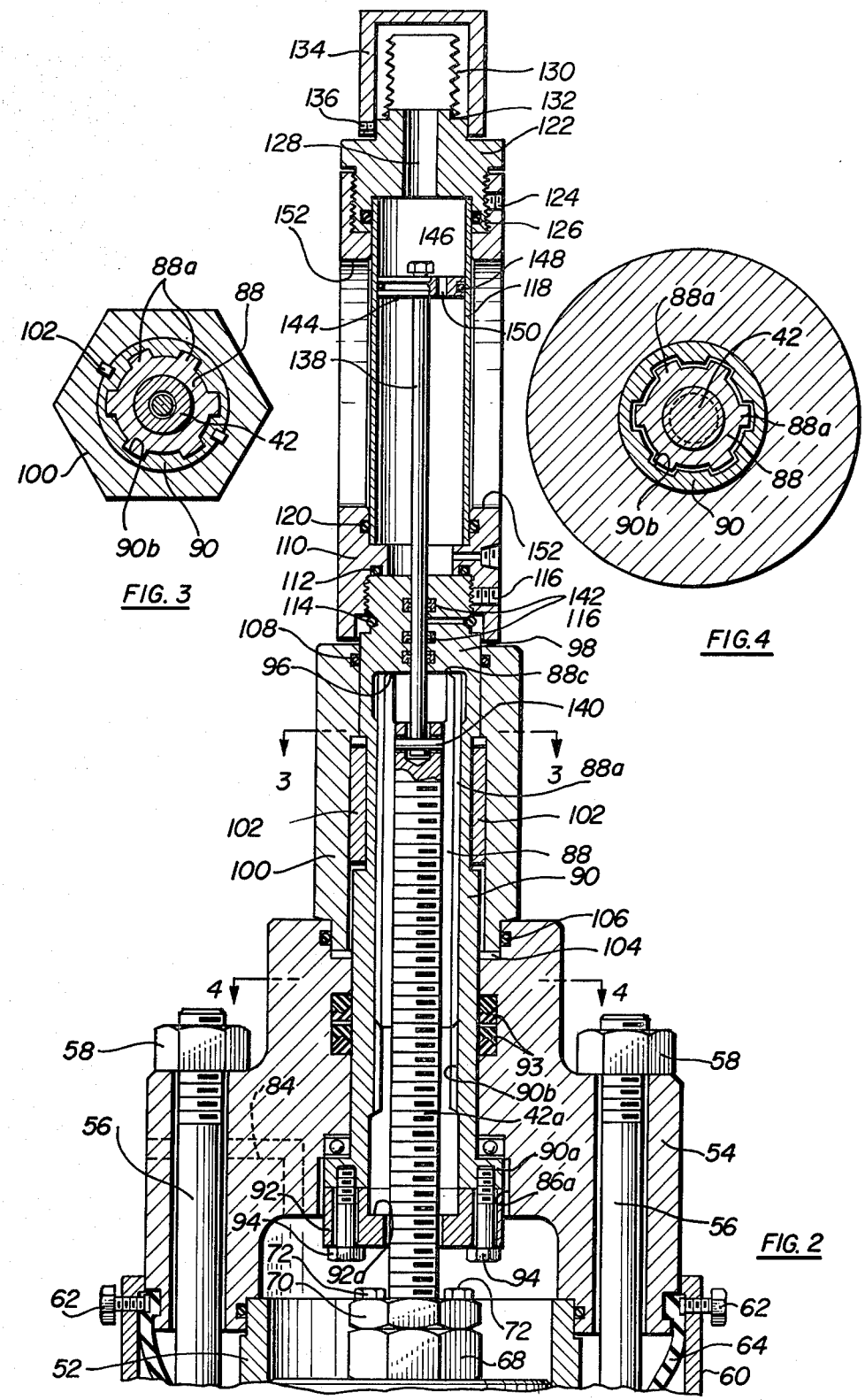

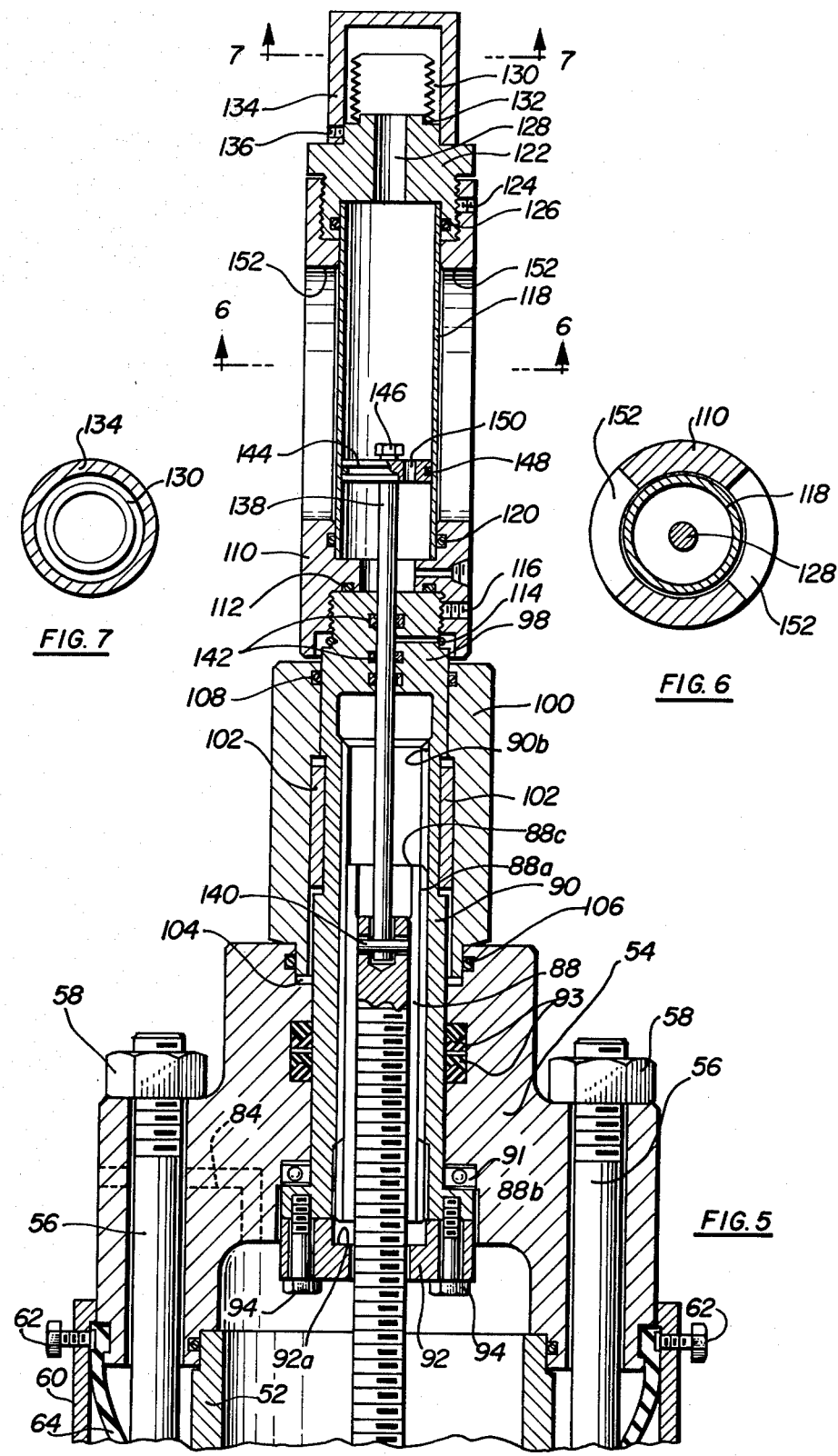

MANUAL OVERRIDE FOR HYDRAULIC GATE VALVE ACTUATORS

BACKGROUND OF THE INVENTION

This invention relates generally to valve actuators and deals more specifically with a manual override mechanism for a gate valve actuator, especially the hydraulic actuator of a subsea gate valve. The invention is directed additionally to a visual indicator device that provides a visual indication of the position of the gate.

Subsea gate valves are normally equipped with hydraulic actuators which control the position of the gate remotely from the surface. Typically, the gate is maintained in an open position by hydraulic fluid directed against a piston of the actuator. If an emergency occurs so as to cause a loss of fluid pressure in the actuator, the combined force of a spring and thrust of the valve stem moves the gate to a fail closed position. Conversely, some gates are held in a normally closed position by the fluid pressure and are moved to a fail open position in the event of a loss of hydraulic pressure. As still another alternative, the valve may be a fail-in-position type which is maintained in the position it occupies at the time of failure. With each type of valve, it is usually necessary or desirable to provide a manual override mechanism which permits the gate to be manually opened and closed.

In the past, a telescoping type override has been employed in order to minimize the size of the unit because space limitations take on primary importance in connection with subsea valves. This telescoping override arrangement is the closest known prior art to the present invention and includes a sleeve telescoped over a drive nut which is threaded onto the valve stem. A splined connection between the sleeve and drive nut translates rotation of the sleeve into rotation of the drive nut and consequent threaded advancement of the valve stem to open or close the gate. Rotation of the sleeve is facilitated by an adapter which is connected with the sleeve and which is formed to conveniently receive a wrench or handwheel or another type of tool. To provide for subsequent movement of the gate in an opposite direction in the event of a spring failure, a handwheel located on the opposite end of the valve may be turned to engage a secondary override mechanism. The secondary override acts directly against the gate to push it in a direction opposite the direction it is moved by the primary override.

Although this telescoping type of override mechanism has been generally satisfactory for subsea use, it has not been wholly without problems. The second override necessarily adds to the overall length of the valve, which is a significant drawback with subsea valves and with any other valve used in an environment where size is an important factor. Also, since the two override mechanisms are located on opposite ends of the valve body, the diver or other worker operating the override must have access to both ends of the valve and must know which handwheel to operate in a particular situation. The latter problem has been compounded because of the lack of any type of indicator to provide the diver with an indication of the gate position. The second override has the further disadvantage of requiring additional bearings, packing, seals, and other components which increase the cost and complexity of the valve.

SUMMARY OF THE INVENTION

The present invention is an improvement over the telescoping type manual override which has been used in the past, and its primary goal is to substantially eliminate the problems associated with existing manual overrides for hydraulically actuated gate valves. Another important object of the invention is to provide a visual indicator which is watertight and which is readily visible to a diver in order to give him an indication of the gate position.

In accordance with the invention, a sleeve is telescoped over a drive nut which is threaded onto the stem of a gate valve at a location beyond the hydraulic actuator which normally operates the gate. A splined connection between the sleeve and the drive nut permits the valve stem and drive nut to move axially in normal hydraulic operation without moving the sleeve axially. However, when the override is engaged and the sleeve is turned by means of a hexagonal adapter secured to it, the drive nut is turned and eventually engages one of a pair of abutment surfaces which limit movement of the drive nut axially on the stem in both directions. Continued rotation of the adapter after the drive nut has contacted one of the abutments results in longitudinal advancement of the valve stem in threaded fashion to open or close the valve, depending upon the direction of rotation of the adapter. The override mechanism is double acting in that it is able to both open and close the valve. At the same time, the override is compact by virtue of the telescopic arrangement of its components.

The invention further provides a visual indicator which includes a transparent, watertight cylinder that closely receives an indicator disc carried on a rod forming an axial extension of the valve stem. A metal outer housing which surrounds the transparent cylinder is provided with cutouts or windows so that the disc is readily visible to provide the diver with a visual indication of the position of the gate. A variable volume bellows prevents the pressure in the transparent cylinder from fluctuating appreciably due to extension and retraction of the indicator rod into and out of the cylinder.

DETAILED DESCRIPTION OF THE INVENTION

In the accompanying drawings:

FIG. 2 is a fragmentary sectional view on an enlarged scale showing the details of the manual override mechanism and indicator device incorporated in the valve shown in FIG. 1, with the gate closed and the drive nut of the override mechanism in contact with the top abutment surface of the drive sleeve;

FIG. 3 is a sectional view taken generally along line 3—3 of FIG. 2 in the direction of the arrows;

FIG. 4 is a sectional view taken generally along line 4—4 of FIG. 2 in the direction of the arrows;

FIG. 5 is a fragmentary sectional view similar to FIG. 2, but with the gate in its open position and the drive nut of the override mechanism in proximity to the lower abutment surface of the drive sleeve;

FIG. 6 is a sectional view taken generally along line 6—6 of FIG. 5 in the direction of the arrows; and FIG. 7. is a sectional view taken generally along line 7—7 of FIG. 5 in the direction of the arrows.

Figure 1:
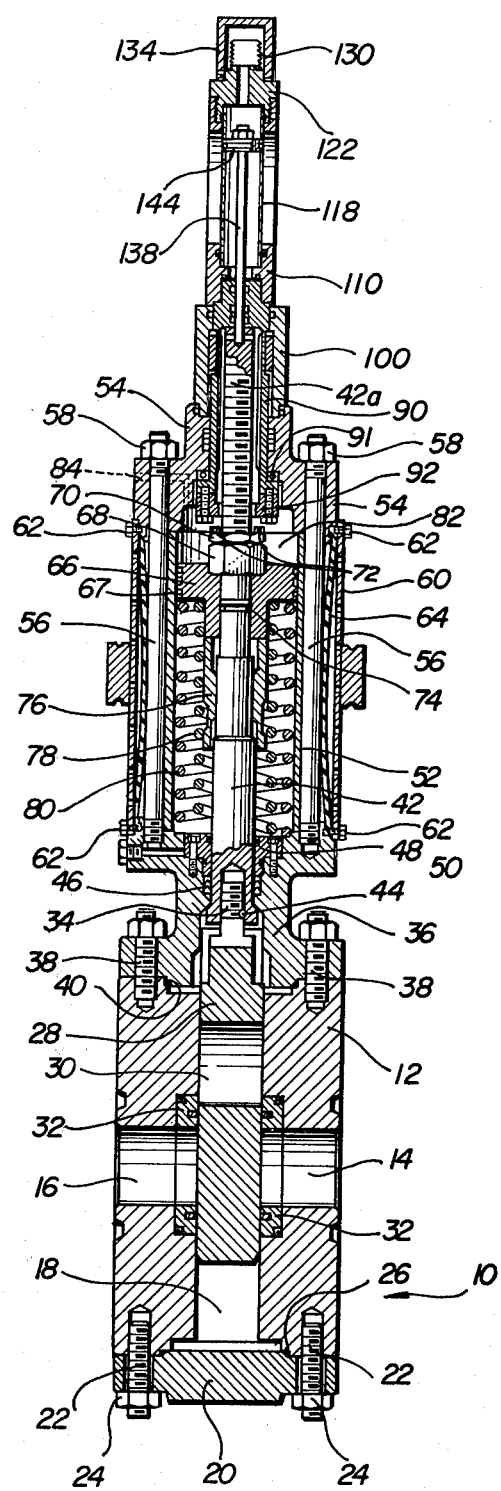
FIG. 1 is a sectional view of a subsea gate valve constructed according to a preferred embodiment of the present invention, with the hydraulic pressure in the actuator relieved and the gate in its closed position.

Referring now to the drawings in more detail and initially fo FIG. 1, numeral 10 generally designates a gate valve constructed in accordance with a preferred embodiment of the present invention. Valve 10 is intended primarily to be used in a subsea environment, although it is suited for use in various other environments, particularly those in which compactness is important. The valve 10 includes a valve body 12 having an inlet passage 14 and an outlet passage 16 which cooperate to present a flow passage extending through the valve body. A valve chamber 18 is formed between the inlet and outlet passages 14 and 16. A plate 20 is secured to the bottom of valve body 12 by threaded studs 22 and nuts 24. A seal ring element 26 provides a tight seal between valve body 12 and cover plate 20.

A slab type gate 28 is mounted in valve chamber 18 for movement between an open position and a closed position relative to the flow passage presented by passages 14 and 16. In the closed position shown in FIG. 1, gate 28 blocks flow between passages 14 and 16. The gate has a port 30 which aligns with passages 14 and 16 when the gate is moved downwardly to its open position wherein fluid is able to pass through the flow passage. A pair of annular valve seats 32 are mounted in seat pockets formed adjacent to the valve chamber 18 to provide seats for gate 28. A short stem 34 extends upwardly from gate 28 into a bonnet 36 which is secured to the top of the valve body by screws 38. A seal ring 40 provides a seal between body 12 and the bonnet 36.

With continued reference to FIG. 1, an elongate valve stem 42 forms an upward axial extension of stem 34. Stem 42 is internally threaded and is screwed onto mating external threads formed on the lower stem 34. A transverse pin 44 secures the connection between stems 34 and 42. Packing 46 is disposed between stem 42 and the central bore through bonnet 36 which receives the stem. Packing 46 includes a plurality of packing rings which are held in place by a packing retainer 48 which is secured to bonnet 36 by screws 50.

Valve stem 42 extends upwardly into a cylinder 52 which forms part of the hydraulic actuator that normally controls the operation of gate 28. Cylinder 52 is supported on top of bonnet 36 and is covered at the top by a cylinder cap 54. The cylinder cap 54 is secured on top of cylinder 52 by tie rods 56 which extend between the cylinder cap and valve bonnet. The lower end of each rod 56 is threaded into bonnet 36, and the tie rods receive nut 58 at their top ends to hold cap 54 in place. A cylindrical metal shroud 60 surrounds cylinder 52 a spaced distance outwardly thereof. A plurality of screws 62 mount shroud 60 to bonnet 36 and to cylinder cap 54. Screws 62 also serve to secure a flexible bladder 64 in place between cylinder 52 and shroud 60. Bladder 64 serves to compensate for the effects of the ambient pressure when the valve is used at a subsea location.

The valve actuator includes a piston 66 which is carried on valve stem 42 at a location within cylinder 52 and which is sealed against the internal wall of the cylinder by seal rings 67. Piston 66 is held in place on the valve stem by a nut 68 and a lock nut 70 which are threaded onto the stem and which receive screws 72. An O-ring 74 effects a seal between piston 66 and stem 42. A piston stop 76 is sleeved onto valve stem 42 and held against the underside of piston 66. The piston stop 76 engages the top surface of the packing retainer 48 in order to limit downward movement of the piston to a position wherein port 30 of gate 28 aligns with passages 14 and 16.

A pair of compression springs 78 and 80 are nested one within the other within cylinder 52 and act upwardly on piston 66 to bias the piston upwardly toward the position shown in FIG. 1, wherein gate 28 is in its closed position. A pressure chamber 82 is formed within the top portion of cylinder 52 above piston 66 to receive hydraulic fluid under pressure through a passage 84 which is formed through cylinder cap 54. The hydraulic fluid is supplied by a suitable source controlled from the surface. If the fluid pressure in chamber 82 is sufficiently high, it overcomes the force of springs 78 and 80 and forces piston 66 downwardly until gate 28 is in its open position. It should be apparent that the valve is of the fail closed type because springs 78 and 80 close gate 28 in the event of a loss of fluid pressure in chamber 82, as may be caused by a malfunction.

In accordance with the present invention, a double acting manual override mechanism is provided to permit manual opening and closing of gate 28. Referring to FIG. 2 in particular, the cylinder cap 54 is provided with a central vertical bore 86 of generally cylindrical shape through which the top portion of valve stem 42 extends. The portion of the valve stem extending through bore 86 is threaded as indicated at 42a. An elongate drive nut 88 of generally cylindrical shape has internal threads which mate with the external threads 42a of stem 42. Drive nut 88 is thus threaded onto valve stem 42 such that rotation of the drive nut effects relative longitudinal movement between it and the valve stem 42. Drive nut 88 receives a generally cylindrical drive sleeve 90 which is fit on the drive nut in a telescopic or sleeved relationship thereto. Sleeve 90 has at its lower end an outwardly projecting flange 90a which is received in a counterbore 86a at the bottom of bore 86. A bearing 91 is mounted in counterbore 86a above flange 90a to permit the sleeve to be easily rotated with respect to cylinder cap 54. A plurality of packing rings 93 are disposed between the outside surface of sleeve 90 and the wall of bore 86.

As best shown in FIG. 4, drive nut 88 has a plurality of splines 88a formed integrally on its outside surface. Splines 88a extend axially of the drive nut along its entire length and are closely received in mating grooves 90b formed in the inside surface of sleeve 90. Grooves 90b extend longitudinally of sleeve 90 along the majority of its length. Sleeve 90 is considerably longer than drive nut 88, and the grooves 90b are somewhat longer than the splines 88a. It should be apparent that the splined connection between drive nut 88 and drive sleeve 90 translates any rotation of sleeve 90 into corresponding rotation of nut 88. However, the axial movement of nut 88 that occurs during normal operation of the valve takes place withing sleeve 90 and without imparting any axial movement to sleeve 90.

A plate 92 is secured to the bottom of sleeve 90 by screws 94 which are threaded through the plate and into the flange 90a of the drive sleeve. Plate 92 has a central opening to permit passage of valve stem 42 therethrough. The upper surface of plate 92 forms a flat shoulder 92a which serves as a lower abutment surface to limit downward movement of drive nut 88 on valve stem 42. When the limiting position is reached, the bottom end 88b of drive nut 88 contacts shoulder 92a to prevent further downward movement of the drive nut. Upward movement of nut 88 on stem 42 is limited by an upper abutment surface 96 formed on the bottom of a solid top end portion 98 of sleeve 90. The flat upper abutment surface 96 faces downwardly, while shoulder 92a faces upwardly and is spaced well below surface 96. The top end 88c of drive nut 88 engages surface 96 to prevent further upward movement of nut 88 after its limiting position is reached. The abutment surfaces 92a and 96 are spaced apart a distance considerably greater than the distance gate 28 moves between its open and closed positions so that drive nut 88 does not contact the abutment surfaces during normal operation of the gate effected by the hydraulic actuator.

A hexagonal adapter 100 is secured to the outside of sleeve 90 by a pair of keys 102 which are fitted in grooves of adapter 100 and sleeve 90. The adapter 100 is mounted on top of cylinder cap 54 and is received at its bottom end on a thrust washer 104 mounted in a counterbore in the upper portion of bore 86. An O-ring 106 provides a seal between adapter 100 and cylinder cap 54, while another O-ring 108 seals between the adapter and sleeve portion 98. As shown in FIG. 3, adapter 100 is hexagonal in section in order to conveniently receive a wrench or power operated tool (not shown). Alternatively, a handwheel (also not shown) may be attached to adapter 100 and turned to rotate the adapter 100 and sleeve 90 through the connection provided by keys 102.

The present invention is also directed to a visual indicator device which provides a visual indication of the position of gate 28. A rigid metal outer housing 110 of the visual indicator is generally cylindrical in shape and has internal threads on its bottom portion which are screwed onto mating male threads formed on the top of sleeve portion 98. Outer housing 110 and sleeve portion 98 are sealed by O-rings 112 and 114, while a set screw 116 secures the threaded connection between housing 110 and sleeve 90. The metal outer housing 110 closely surrounds an inner indicator housing which is in the form of a transparent cylinder 118. The cylinder 118 is a watertight structure and is sealed to outer housing 110 by an O-ring 120. The top portion of outer housing 110 is internally threaded in order to receive an externally threaded cylinder cap 122 which is screwed down onto outer housing 110 and against the top of cylinder 118. A set screw 124 is threaded into housing 110 and against cap 122, and an O-ring 126 provides a seal between the cylinder and cylinder cap. The cylinder cap 122 has a central vertical passage 128 which provides communication between the watertight chamber or compartment defined within cylinder 118 and a bellows 130 which is mounted on top of cap 122. The bellows 130 has an expansible and contractable internal chamber which connects with passage 128 and which serves to compensate for volume changes in cylinder 118, as will be explained in more detail. Bellows 130 is braised to cap 122 as indicated at 132. A rigid metal cover 134 is fitted closely around the bellows and is secured to cap 122 by a set screw 136.

The visual indicator device includes a rod 138 which is secured to the top end of valve stem 42 in a manner to form an upward axial extension thereof. The lower end of rod 138 fits in an opening in the top end of valve stem 42 and is secured therein by a transverse pin 140. Rod 138 projects upwardly from stem 42 through a central passage formed in sleeve portion 98 and through an opening in the bottom of housing 110. A plurality of GT rings 142 seal the rod with sleeve portion 98 while permitting it to reciprocate back and forth with respect thereto. The upper end of rod 138 is located within cylinder 118 and carries a disc 144 which serves as an indicator element to indicate the position of gate 28.

Disc 144 is received on the top end of rod 138 and is secured thereon by a shoulder screw 146. Disc 144 has approximately the same diameter as the inside of cylinder 118 and has a groove on its periphery which carries a wiper ring 148 that firmly contacts the internal wall of cylinder 118. Disc 144 has a plurality of openings 150 passing through it to provide fluid communication between its upper and lower surfaces.

As best shown in FIG. 6, the outer housing 110 of the indicator has a pair of cutouts of windows 152 formed through it so that the transparent cylinder 118 and indicator disc 144 are readily visible from the exterior of the valve. Windows 152 are diametrically opposed on housing 110, and each window extends through an arc of approximately 90°. Accordingly, a diver is provided with visual access to disc 144 from either side of the indicator device.

In normal operation of the valve, pressurized hydraulic fluid is forced into chamber 82 through passage 84 in order to move piston 66 downwardly such that gate 28 is held in its open position. In the event of a malfunction cutting off fluid pressure, chamber 82 is relieved and springs 78 and 80 push piston 66 upwardly, thereby moving gate 28 to the fail closed position shown in FIG. 1. It should be noted that during such normal operation of the valve, drive nut 88 is able to move upwardly and downwardly within and relative to sleeve 90 without contacting the abutment surfaces 92a or 96.

In order to override springs 78 and 80 and move gate 28 manually to its open position, adapter 100 can be turned by a diver in the appropriate direction, such as with a wrench, a power tool, or a handwheel mounted on the adapter. Rotation of adapter 100 is translated by keys 102 into rotation of drive sleeve 90, which in turn rotates drive nut 88 due to the splined connection between the sleeve and the drive nut. Such rotation of drive nut 88 initially causes it to move upwardly in threaded fashion on valve stem 42 until the top end 88c of the drive nut contacts the upper abutment surface 96 (see FIG. 2), whereupon further upward movement of nut 88 is precluded. Continued rotation of nut 88 after its limiting position is reached causes valve stem 42 to move downwardly in threaded fashion against the force applied to piston 66 by springs 78 and 80. Consequently, valve stem 42 is moved downwardly to effect movement of gate 28 downwardly and eventually to its open position.

Ordinarily, springs 78 and 80 return gate 28 to the closed position if the override mechanism is subsequently backed off by turning adapter 100 in an opposite direction so as to permit stem 42 to move upwardly with respect to drive nut 88. However, if springs 78 and 80 should break or otherwise fail, the gate will remain open when the override is initially backed off. To close the gate in this situation, adapter 100 is turned in the appropriate direction a sufficient number of times to thread drive nut 88 downwardly on valve stem 42 until the bottom end 88b of the drive nut is moved into contact with the lower abutment surface or shoulder 92a, whereupon further downward movement of the drive nut is precluded. Continued rotation of adapter 100 causes valve stem 42 to move upwardly due to its threaded relationship with drive nut 88. Such upward movement of the valve stem eventually moves gate 28 to its fully closed position.

It should be noted that the sleeved or telescopic relationship among adapter 100, sleeve 90, and drive nut 88 results in a compact arrangement of the components of the override mechanism. In addition, normal hydraulic actuation of the valve can take place without interference from the override mechanism and without movement of sleeve 90 or the other parts of the override except nut 88, which moves freely up and down within sleeve 90. Accordingly, the override is particularly well suited for use with subsea gate valves, although it is equally well suited for use with any type of valve employed in a situation involving space limitations.

As gate 28 is moved between the opened and closed positions, either by means of the hydraulic actuator or the manual override, indicator disc 144 moves up and down in direct proportion to the gate movement, by reason of its rigid connection with the valve stem. Therefore, when disc 144 is near the upper end of cylinder 118 as shown in FIG. 2, it provides a visual indication that the gate is closed. Conversely, when disc 144 is near the bottom of cylinder 118 as shown in FIG. 5, an indication is given that the gate is in its open position. The diver or other worker operating the override can thus simply sight through one of the windows 152 and notice the position of disc 144 to determine whether the gate is open or closed. It is contemplated that cylinder 118 may be provided with calibration marks labeled to indicate whether the gate is fully open, fully closed, or at any of a variety of intermediate positions between opened and closed.

Cylinder 118 is watertight in order to prevent the ambient pressure from affecting operation of the indicator device. The openings 150 through disc 144 permit the air within cylinder 118 to pass between opposite sides of the disc without being compressed as the disc moves upwardly and downwardly within the cylinder. During operation of the device, rod 138 is extended into and retracted out of the fluid tight cylinder 118, thereby varying the open volume within the cylinder. As this occurs, the variable volume chamber within bellows 130 expands and contracts in order to compensate for the volume change while avoiding an undue buildup of pressure within the indicator device which could adversely affect its operation.

What is claimed is:

1. An actuator device for a subsea gate valve having a gate movable between open and closed positions, said actuator device comprising:
   an externally threaded valve stem fixed to said gate for movement with the gate between open and closed positions thereof;
   a piston connected to said valve stem;
   a cylinder closely receiving said piston and adapted to receive pressurized fluid to force the piston and stem in a first direction axially of the stem;
   a spring biasing said piston in a second direction opposite said first direction to move said piston and stem in the second direction in the absence of fluid pressure in said cylinder above a predetermined level;
   an internally threaded nut member threaded onto said valve stem for longitudinal movement therewith;
   means limiting movement of said nut member axially on said stem in both directions so that sufficient rotation of said nut member in opposite directions effects axial movement of said stem in both directions to open and close the gate;
   a sleeve telescoped on said nut member, and spline means connecting the sleeve and nut member so that rotation of said sleeve is translated into rotation of said nut member but said nut member is movable within and relative to such sleeve axially of the valve stem for the entire travel of the gate between open and closed positions, said sleeve being adapted to be rotated manually to effect movement of the gate between its open and closed positions.

2. A gate valve structure comprising:
   a valve body having inlet and outlet flow passages with a valve chamber therebetween;
   a gate mounted in the valve chamber for movement between open and closed positions relative to said flow passages;
   an externally threaded valve stem extending from the gate and axially movable in opposite directions to move the gate between its open and closed positions;
   a piston connected with said valve stem;
   a cylinder closely receiving said piston therein and presenting an enclosed pressure chamber on one side of the piston adapted to receive pressurized fluid to force the piston and valve stem in a first direction axially of the valve stem;
   a yieldable means for moving said piston and valve stem in a second direction opposite said first direction in the absence of fluid pressure in said pressure chamber above a predetermined level;
   an externally threaded nut member threadedly connected with said valve stem in a manner to effect axial movement thereof in said first direction in response to rotation of said nut member in a preselected direction;
   a sleeve received on said nut member in a sleeved relationship therewith and adapted to be rotated from the exterior of the valve body;
   a longitudinally extending spline connection between said sleeve and nut member translating rotation of said sleeve into rotation of said nut member but permitting relative movement between said sleeve and nut member axially of said valve stem, whereby said sleeve may be rotated to effect axial movement of said stem in said first direction against the force of said yieldable means;
   a watertight indicator housing mounted to said cylinder in a sealed relationship therewith and formed of transparent material so that the interior of said indicator housing is visible from the exterior of the valve body; and
   an indicator member coupled with said valve stem for movement therewith to provide a visual indication of the position of said gate, said indicator member being located within said indicator housing and being visible therein from the exterior of the valve body.

3. A gate valve structure as set forth in claim 2, wherein said indicator member comprises a disc disposed within said indicator housing in contact with the internal surface thereof, said disc having at least one opening therein to permit passage of air through the disc as same is reciprocated within said indicator housing in response to axial movement of the valve stem.

4. A gate valve structure as set forth in claim 2, including:
   a rod member coupled with the valve stem to form an axial extension thereof, said rod member projecting into said indicator housing in sealed relation thereto and carrying said indicator member; and
   a variable volume bellows disposed in fluid communication with said indicator housing to accommodate extension and retraction of said rod member into and out of said indicator housing.

5. A gate valve structure as set forth in claim 2, including a metal outer housing mounted on said cylinder in closely surrounding relation to said indicator housing, said outer housing having at least one cutout area to expose said indicator housing.

6. A gate valve structure comprising:
a valve body having inlet and outlet folw passages with a valve chamber therebetween;
a gate mounted in the valve chamber for movement between open and closed positions relative to said flow passages;
an externally threaded valve stem fixed to the gate for reciprocation therewith and movable with the gate between its open and closed positions;
a piston connected with said valve stem;
a cylinder closely receiving said piston therein and presenting an enclosed pressure chamber on one side of the piston adapted to receive pressurized fluid to force the piston and valve stem in a first direction axially of the valve stem;
yieldable means for moving said piston and valve stem in a second direction opposite said first direction in the absence of fluid pressure in said pressure chamber above a predetermined level;
an internally threaded nut member threadedly connected to and moving longitudinally with said valve stem;
a pair of spaced apart abutments so located as to be engaged by said nut member to prevent the nut member from moving axially on said valve stem beyond limiting positions, said valve stem thereby moving axially upon continued rotation of said nut member after either limiting position has been reached;
a sleeve received on said nut member in a sleeved relationship therewith and adapted to be rotated from the exterior of the valve body; and
longitudinally extending spline means connecting said sleeve and nut member in a manner translating rotation of said sleeve into rotation of said nut member but permitting relative movement between said sleeve and nut member axially of said valve stem, whereby said sleeve may be rotated in opposite directions to effect axial movement of said stem in both said first and second directions to move said gate between its open and closed positions.

7. A gate valve structure as set forth in claim 6, wherein said abutments are located on opposite end portions of said sleeve and are spaced apart a distance gerater than the distance said gate moves between its open and closed positions.

8. A gate valve structure as set forth in claim 6, including an adapter secured to said sleeve and accessible from the exterior of said valve body to effect rotation of the sleeve.

9. A gate valve structure as set forth in claim 6, wherein said spline means comprises a plurality of splines formed integrally on the exterior of said nut member and a plurality of grooves in said sleeve which closely receive said splines.

10. A double acting manual override mechanism for a gate valve having a piston movable in opposite directions to open and close a gate valve member, a cylinder closely receiving said piston and adapted to receive pressurized fluid to move said piston in a first direction, and means for moving the piston in a second direction opposite said first direction when the pressure in said cylinder is below a predetermined level, said override mechanism comprising:
an externally threaded shaft secured to the piston and movable axially to move the piston in opposite directions;
an internally threaded nut member threaded onto said shaft for longitudinal movement therewith;
means for limiting movement of said nut member axially along said shaft in both directions, said nut member being rotatable in opposite directions to effect movement of said shaft in both axial directions after limiting positions of the nut member are reached;
a sleeve received on said nut member and adapted to be rotated manually; and
a plurality of splines connecting said sleeve with said nut member in a manner translating rotation of said sleeve into rotation of said nut member but permitting relative movement between said sleeve and nut member axially of said shaft, whereby said sleeve may be rotated manually in opposite directions to move said shaft and piston in both said first and second directions to open and close the gate valve member.

11. An override mechanism as set forth in claim 10, wherein said means for limiting movement of said nut member comprises a pair of abutments spaced apart from one another on opposite end portions of said sleeve at locations to engage said nut member at the limiting positions thereof.

12. In a subsea gate valve having a valve body with inlet and outlet flow passages and a valve chamber, a gate mounted in the valve chamber for movement between open and closed positions relative to the flow passages, an externally threaded valve stem extending from the gate and connected to a piston, a cylinder closely receiving said piston and adapted to receive pressurized fluid to force the piston and valve stem in a first axial direction, and resilient means urging said piston and valve stem in a second direction opposite said first direction, the improvement comprising:
an internally threaded nut member threadedly connected with said valve stem in a manner to effect movement thereof in said first direction against the force of said resilient means upon rotation of the nut member in a preselected direction;
a sleeve received on said nut member in a sleeved relationship thereto and adapted to be rotated from the exterior of said valve body;
spline means connecting said sleeve with said nut member to rotate said nut member in response to rotation of said sleeve but permitting relative movement between said nut member and sleeve axially of said stem, whereby said sleeve may be rotated to rotate said nut member in said preselected direction to effect axial movement of said stem in said first direction;
an axial extension of said stem projecting away from the gate;
a transparent housing receiving said extension in a sealed relation and presenting a fluid tight compartment; and
an indicator member carried on said extension within said compartment, said indicator member being visible through said transparent housing to provide a visual indication of the position of the gate.

13. The improvement set forth in claim 12, including a variable volume bellows in fluid communication with said compartment to accommodate volume changes thereof as said axial extension is moved into and out of said transparent housing.

14. The improvement set forth in claim 12, including a metal outer housing closely surrounding said indicator housing and having at least one window through which said indicator housing is visible.

* * * * *